June 18, 1940.  R. BERGER ET AL  2,205,131
METHOD OF AND APPARATUS FOR WASHING VEGETABLES
Filed May 3, 1938  2 Sheets-Sheet 1

INVENTORS:
RUDOLPH BERGER
HAROLD N. RICKET
BY Saywell and Wesseler
ATTORNEYS

June 18, 1940. R. BERGER ET AL 2,205,131
METHOD OF AND APPARATUS FOR WASHING VEGETABLES
Filed May 3, 1938 2 Sheets-Sheet 2

INVENTORS:
RUDOLPH BERGER
HAROLD N. RICKET
BY Saywell and Wesseler
ATTORNEYS

Patented June 18, 1940

2,205,131

UNITED STATES PATENT OFFICE 2,205,131

METHOD OF AND APPARATUS FOR WASHING VEGETABLES

Rudolph Berger and Harold N. Ricket, Amherst, Ohio, assignors to The American Specialty Company, Amherst, Ohio, a corporation of Ohio Application May 3, 1938, Serial No. 205,748

6 Claims. (Cl. 146—194)

Our invention relates to improved methods of washing vegetables, and improved apparatus by which said methods may be worked, the invention being particularly applicable to the washing of bunched vegetables. By the improved methods and apparatus all kinds of bunched vegetables, such as bunches of radishes, carrots, beets, parsley, green onions, celery, etc., are efficiently washed and without injury to the leaves and stems of the bunched material. The washing is effected automatically, and without the necessiity of experienced operators, and at a high rate of production.

The annexed drawings and the following description set forth in detail certain means exemplifying our improved apparatus and certain steps illustrating the working of our improved methods, said drawings and description disclosing, however, only a few of the various series of steps by which our improved methods may be carried out and only a few of the various forms of apparatus in which the principle of our improved apparatus may be embodied.

Figure 1:
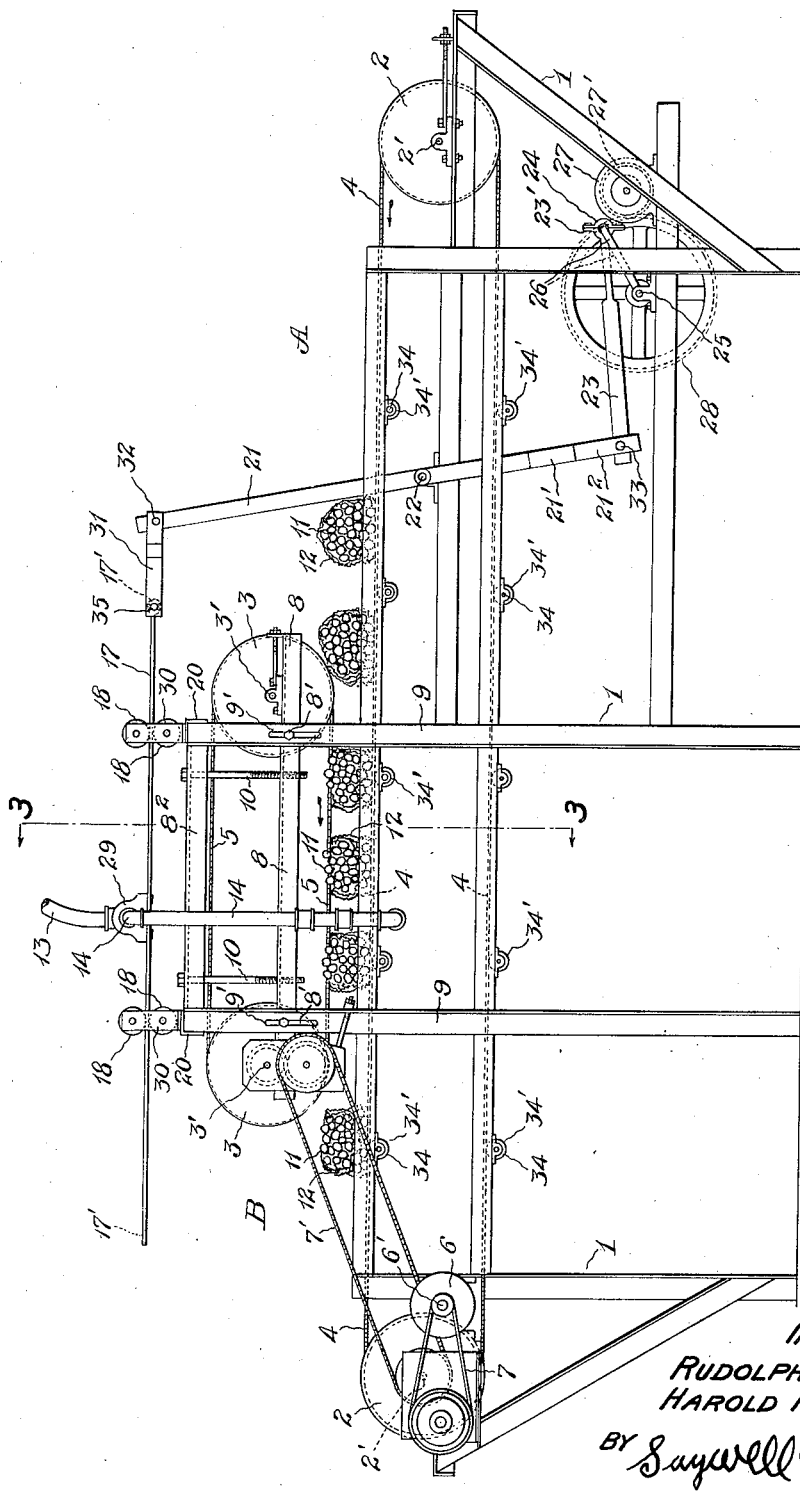
Figure 1 is a side elevation of a form of our improved apparatus in which our improved methods may be worked.

Our improved methods are designed to spray the bunched vegetables with high-pressure water directed from various angles while the bunched material is being carried forwardly in a continuous run of bunches upon a suitable conveyor, the stems and leaves of the bunches being fairly securely but somewhat resiliently retained in position relatively to the conveyor, whereby the bunches are held in place on the conveyor and the stems and leaves are protected, the roots of the vegetables being exposed to the full force of the water impinging thereon while the leaves and stems are somewhat protected from the water pressure through the breaking up of the spray before it impinges thereon.

Referring to the annexed drawings in which the same parts are indicated by the same respective numbers in the several views, the improved apparatus for working said improved methods of washing vegetables consists of a suitable skeleton frame 1 in which are mounted, at different levels, upon respective shafts 2' and 3', two pairs of opposed rollers 2 and 3 over which play spaced opposed endless foraminous conveyors 4 and 5, respectively, such conveyors being preferably formed from wire mesh. The lower conveyor 4, which is the load conveyor, runs over spaced rollers 34' mounted on roller shafts 34. Movement of the lower load conveyor 4 is effected from the shaft 6' of a motor 6 through a belt 7 and suitable pulleys, gear-reducers, couplings, and gears, and movement of the upper conveyor 5 from the actuating mechanism of the lower conveyor 4 through a sprocket chain 7', suitable sprockets, and gears. The motor 6 is equipped with a suitable variable speed pulley (not shown) to provide a considerable range of speeds for the conveyors. The actuating mechanism for the conveyors 4 and 5 is so arranged as to move these conveyors in the same direction and at the same speed.

Figure 2:
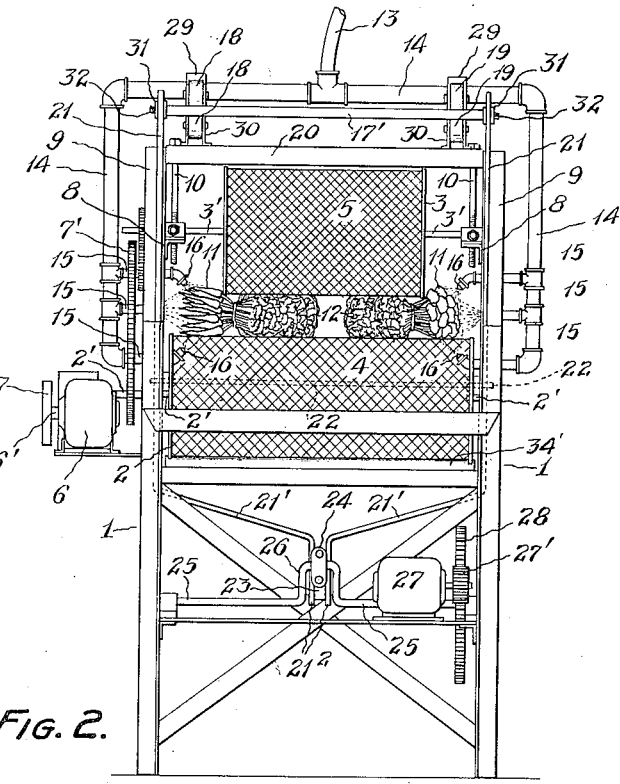
Figure 2 is a right hand end view of the apparatus shown in Figure 1.
Figure 3:
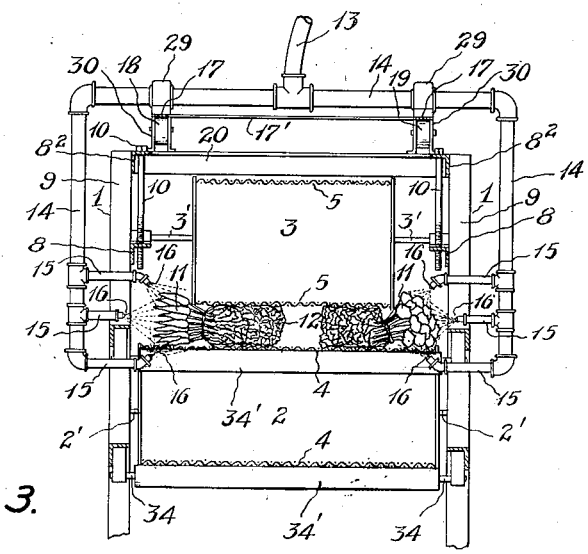
Figure 3 is a transverse vertical section, taken in the plane indicated by the line 3—3, Figure 1.

The conveyors 4 and 5 travel in substantially parallel planes and the lower conveyor 4 is materially wider than the upper conveyor 5, the lower conveyor 4 overlapping the upper conveyor 5 substantially equal distances at both edges, as clearly shown in Figure 2. The space between the upper run of the lower conveyor 4 and the lower run of the upper conveyor 5 is such as to accommodate the stems and leaves 12 of bunches of vegetables being washed, as clearly shown in Figures 2 and 3, the roots 11 of the bunches extending laterally of the upper conveyor 5 and resting upon the overlapping portions of the lower conveyor 4. The distance between the two conveyors 4 and 5 is so gauged as to cause the lower run of the upper conveyor 5 to hold the leaves and stems to the upper run of the lower conveyor 4, this holding being a somewhat resilient one and not compressible enough to injure the leaves and stems. However, the holding of the leaves and stems 12 is sufficiently strong to retain the bunches in place on the lower conveyor 4.

In order that the space between the two conveyors may be adjusted to accommodate different sizes of vegetable bunches, we provide a vertical adjustment for the upper conveyor 5 which consists in bolts 10 mounted in upper frame angles 8² and depending therefrom and having threaded lower ends which engage lower frame angles 8 upon which the upper pair of rollers 3 are mounted, said frame angles 3 being provided with bolts 8' passed transversely therethrough and positioned in elongated vertical slots 9' formed in the center legs 9 of the frame 1.

As the bunched vegetables are moved forwardly on the conveyor 4 they are washed by sprays 16 discharged from a plurality of nozzles 15 mounted upon feed headers 14, and so distributed as to spray the wash water upon the vegetable bunches at different angles and from different levels. The feed headers 14 which are mounted upon brackets 29 extend upon both sides of the machine so as to spray two series of vegetable bunches being conveyed upon the two respective sides of the machine, these feed headers 14 being supplied with washing liquid through a flexible coupling 13 which derives the washing liquid from a suitable source of supply. Inasmuch as the roots 11 of the bunches are substantially entirely exposed and since the nozzles 15 discharge both upon the top and the bottom of the bunched roots and onto the sides thereof, the roots are given a very thorough and uniform washing treatment. Some of the water is also sprayed upon the leaves and stems 12, thereby also washing and rinsing them but, inasmuch as the leaves and stems are somewhat closely confined between the conveyors 4 and 5 and inasmuch as the wire mesh of the lower run of the upper conveyor 5 breaks up the direct spray, the leaves and stems are not injured by the water pressure. Preferably the pressure utilized for spraying the water is quite high, up to 400 pounds per square inch.

In one type of washer, the water headers 14 are mounted upon a reciprocating skeleton carriage, such as a cross-head having spaced longitudinal side members 17 and end members 17', of which the side members 17 are mounted between pairs of opposed rollers 18 and 19 rotatably mounted in spaced angular plates 30. The plates 30 are mounted upon cross angles 20 supported at their ends by the center legs 9 of the main frame 1. Pivoted to pins 35 outwardly extended from the ends of the inner end cross-head member 17' are clevises 31 between the arms of which are secured by respective pivot pins 32 a pair of downwardly-extended side levers 21. These side levers 21 are pivotally mounted intermediate their ends upon a cross rod 22, the lower end portions 21' of said levers 21 being bent inwardly toward each other and having extreme terminal portions 21² bent downwardly in parallel and closely adjacent relation and pivotally secured by a pin 33 to an end of a connecting rod 23. The connecting rod 23 has an opposite end face member 23' forming a half-bearing which cooperates with a half-bearing member 24 to form a complete bearing for a crank 26 formed intermediate of the ends of a crank rod 25. One end of the crank rod 25 is journalled upon the frame 1 and the other end is secured to the hub of a gear wheel 28. The gear wheel 28 is actuated by a motor 27 through intermediate transmission members 27'.

The transmission determining the speed of reciprocation of the cross-head 17—17' is such as to reciprocate said cross-head several times during the passage of the conveyor 4 over its upper run so that the nozzles 15 are brought into various positions relative to the vegetable bunches, each bunch being sprayed repeatedly from any one nozzle during the travel of the bunch through the apparatus, the spray being directed at times toward the front of the oncoming bunch and at other times toward the rear of the receding bunch, and also at different angles upon the top and bottom of the bunch.

From the aforegoing description, together with the accompanying drawings, the operation of our improved apparatus, and the working of the improved methods, will be readily apparent. The motor 6 moves the conveyors 4 and 5 in the same direction and at the desired same speed and the vegetables in bunches are placed upon the moving conveyor 4 at the loading end A of the machine, the bunches being so arranged that the stems and leaves 12 thereof will pass into the space between the conveyors 4 and 5, with the roots 11 laterally outwardly extending therefrom. As the vegetables are moved forwardly they are sprayed at different angles by water from the nozzles 15 and, if the reciprocatory cross-head is utilized, are repeatedly sprayed by each nozzle 15 and from constantly changing positions of the latter relative to the vegetable bunches. The leaves and stems 12 are so held by the upper conveyor 5 as to protect them from injury and yet at the same time to effect a washing and rinsing thereof and to hold the entire bunch in place while being conveyed and washed. After passing through the washing area, the washed bunches are removed at the discharge end B of the machine or permitted to drop from the conveyor 4 into a suitable receiving receptacle.

What we claim is:

1. Apparatus for washing vegetables comprising two relatively superposed spaced and substantially parallel endless belts, the lower belt being substantially wider than and overlapping the upper belt, thus providing a washing zone between the belts and an adjacent washing zone confronting the overlapping portion of the wider belt, the narrower belt being of foraminous formation, means for moving the belts in the same direction and at the same speed, and liquid spraying means, the latter being arranged to cause the spray in part, to intersect the narrower belt and thus be broken thereby and then to pass into the first-mentioned washing zone, and, in part, directly to intersect the second-mentioned washing zone.

2. Apparatus for washing vegetables comprising a foraminous conveyor and means for moving the same, a carriage having a reciprocatory path of movement substantially parallel to and longitudinally of a given section of the path of travel of the conveyor, means for moving the carriage forwardly and rearwardly at a speed greatly in excess of the speed at which the conveyor is moved, and liquid-spraying means mounted on the carriage above and below the conveyor and directed toward said section of the path of travel of the conveyor, whereby vegetables mounted upon the conveyor are impinged upon by the spray from said spraying means repeatedly from the front and from the rear and from all angles between the front and rear as the conveyor passes through said section of its path of travel.

3. Apparatus for washing vegetables comprising two relatively superposed spaced and substantially parallel endless foraminous belts, the lower belt being substantially wider than and overlapping the upper belt, thus providing a washing zone between the belts and an adjacent washing zone confronting the overlapping portion of the wider belt, means for moving the belts in the same direction and at the same speed, a carriage having a reciprocatory path of movement substantially parallel to a given section of the path of travel of the belts, means for moving the carriage forwardly at a speed greatly in excess of the speed at which the belts are moved and also for moving the carriage rearwardly, and liquid-spraying means mounted on the carriage and directed toward said section of the path of travel of the belts, whereby vegetables mounted upon the wider belt in said washing zones are impinged upon by the spray from said spraying means from the front and from the rear and from all angles between the front and rear as the belts pass through said section of their path of travel, said spraying means being arranged to cause the spray, in part, to intersect the narrower belt and thus be broken thereby and then pass into the first-mentioned washing zone, and, in part, directly to intersect the second-mentioned washing zone.

4. A process of washing bunched vegetables which have leafy and root portions comprising the steps of moving bunches of such vegetables in a continuous run, compressing the leafy portions of the vegetables in such manner as to support the vegetables during washing, directing streams of washing liquid forcefully and directly upon the root portions of the vegetables, and passing a separate stream of washing liquid relatively gently upon the leafy portions of the vegetables.

5. A process of washing vegetables which have leafy and root portions comprising the steps of moving such vegetables in a continuous run, compressing the leafy portions of the vegetables in such manner as to support the vegetables during washing, spraying washing liquid forcefully upon the root portions of the vegetables, forcefully spraying toward the leafy portions of the vegetables washing liquid additional to that sprayed upon the root portions, and reducing the force of the aditional washing liquid before it reaches the leafy portions, whereby the leafy portions are relatively gently washed and the root portions are relatively vigorously washed.

6. A process of washing bunched vegetables which have leafy and root portions comprising the steps of moving bunches of such vegetables in a continuous run, compressing the leafy portions of the vegetables sufficiently to support the vegetables during washing, forcefully spraying washing liquid at constantly changing angles toward both the leafy and root portions of the vegetables, and intercepting that part of the washing liquid directed toward the leafy portions in such manner as to reduce its force and to provide a stream of washing liquid passing relatively gently upon the leafy portions.

RUDOLPH BERGER.
HAROLD N. RICKET.